United States Patent [19]

Vigneault et al.

[11] Patent Number: 5,180,793

[45] Date of Patent: Jan. 19, 1993

[54] FLAME RESISTANT, LOW PILLING POLYESTER FIBER

[75] Inventors: Richard E. Vigneault, Mayo; William S. Wagner, Spartanburg, both of S.C.; Klaus Weisskopf, Wiesbaden, Fed. Rep. of Germany; R. Edward Williamson, Matthews, N.C.; A. John Woodward, Spartanburg, S.C.

[73] Assignee: Hoechst Celanese Corporation, Somerville, N.J.

[21] Appl. No.: 815,204

[22] Filed: Dec. 31, 1991

[51] Int. Cl.$^5$ ............................................. C08S 20/20
[52] U.S. Cl. .................................. 525/446; 525/437; 525/444; 525/448; 525/474; 525/538; 528/272; 528/283; 528/287; 528/302; 528/308; 528/308.7; 428/224
[58] Field of Search ............... 525/437, 444, 446, 448, 525/474, 538; 528/272, 283, 287, 302, 308, 308.7; 428/224

[56] References Cited

U.S. PATENT DOCUMENTS

Re. 783  10/1981  Kleiner et al. ..................... 528/287
3,335,211  8/1967  Mead et al. ..................... 264/211.24
3,576,773  6/1969  Vaginay ............................. 525/291
3,941,752  3/1976  Kleiner et al. ..................... 528/287
3,953,394  4/1976  Fox et al. ........................... 528/287
4,033,936  7/1977  Bollert et al. ...................... 528/287

Primary Examiner—John Kight, III
Assistant Examiner—Sam A. Acquah
Attorney, Agent, or Firm—Philip P. McCann

[57] ABSTRACT

The invention is a polyester and a method for producing a polyester filament which has a combination of flame resistance and low pilling properties. The method comprises forming a polyester polymer from a mixture of two polymers, the first compound being the reaction product of terephthalic acid or dimethyl terephthalate, ethylene glycol, and an oxysilicon compound and the second compound being the reaction product of terephthalic acid or dimethyl terephthalate, ethylene glycol and a phosphinic acid in the amount between 0.5 and 20 mole percent of the terephthalate acid and monomer. In particular, the invention also comprises the enhanced fiber formed by the process, as well as the fabrics having a pilling of about 3 to less than 5 as measured in accordance with ASTM D-3512-82.

28 Claims, No Drawings

FLAME RESISTANT, LOW PILLING POLYESTER FIBER

FIELD OF THE INVENTION

The present invention relates to polyester fibers and their use in textile applications, and in particular relates to an enhanced polyester fiber material having a combination of flame resistance and low pilling.

BACKGROUND OF THE INVENTION

Polyester has long been recognized as a desirable material for textile applications including garments, upholstery and numerous other uses. The processes for manufacture of polyester are relatively well known and straight forward to those knowledgeable in the art, and fibers made from polyester can be appropriately woven or knitted to form textile fabrics. Polyester fibers can be blended with other fibers such as wool or cotton to produce fabrics which have the enhanced strength, durability and memory aspects of polyester and retain many of the desirable qualities of the natural fiber with which the polyester is blended.

As with any fiber, the particular polyester fiber from which any given fabric is formed must have properties suitable for the end use of the fabric. In many applications such as sleepwear fabrics, draperies, and bedspreads, for example, it is desirable for the textile fabric to have the property of flame resistance. Flame resistant fabrics are defined as fabrics that will self extinguish when an ignition source is removed. Requirements are set forth in various tests including the NFPA 701-1977.

One technique for attaining flame resistance of fabrics of polyester fiber is to modify the polyester with carboxyphosphinic acids. Such modified polyester fibers and their use in fabrics are disclosed in U.S. Pat. Nos. 3,941,752; 4,033,936; and RE 30,783. In fact, these patents describe flame resistant linear polyesters which are modified polyesters consisting of dicarboxylic acid derived components, diol derived components and phosphorus containing chain members, the latter being derived from structural units of the formula

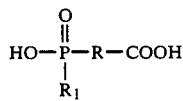

which constitute about 1-20 mole percent of the acid component of the polyester. In this formula R is a saturated open-chained or cyclic alkylene, arylene, or aralkylene having from 1-15, preferably from 2-10 carbon atoms and R is an alkyl radical having up to 6 carbon atoms or an aryl radical or an aralkyl radical as described in U.S. Pat. No. 3,941,752. Such modified polyester fibers are currently available from Hoechst Celanese Corporation.

Although fabrics containing polyester fibers as described above provide flame resistance, such fibers have an undesirable propensity upon prolonged use to exhibit small, compact groupings of entangled fibers (i.e., fuzzballs) on the fabric surface. Such fiber groupings commonly are termed "pills" and tend to form and to tenaciously adhere to the surface of the fabric as the fabric encounters surface abrasion during normal use. The aesthetic appearance of fabric accordingly may be adversely influenced by these relatively small groupings of entangled fibers which are retained on the surface of the fabric.

Heretofore, it has been believed that the prevalence of such pills can be traced to the relatively high strength of the synthetic fibers present in the fabric. For instance, the pills may be more or less permanently attached to the fabric surface by one or more synthetic polymer fibers extending out of the fabric which will resist breakage as the surface abrasion continues. This theory of pill formation is supported by the significant lower level of the retention of undesired fuzzballs on the surface of fabrics consisting solely of cotton fibers following the same surface abrasion conditions. It is believed that the entangled cotton fibers which form at the surface of a fabric more readily break away since the cotton fibers are of an inherently lower strength.

This pilling problem may be observed in fabrics formed in whole or in part from polyethylene terephthalate (PET) fibers. Pills commonly are observed on fabrics formed from blends of cotton and PET staple fibers following use in service and during the cleaning process including laundering or dry cleaning. While pills may be observed on fabrics having a wide variety of constructions, they are more commonly observed on loosely constructed fabrics, particularly knitted fabrics.

One approach heretofore proposed to reduce the pilling of fabrics is to reduce the tenacity (or strength) of the PET fibers by using a low molecular weight (measured as intrinsic viscosity) PET polymer. Low intrinsic viscosity provides a general indication of reduced polymeric chain length and leads to fibers having a lesser strength. Accordingly, when such entangled fibers become free on the surface of the fabric following abrasion, the fibers tend to cleanly break away and not hold a fuzzball at the surface of the fabric.

It has been found, however, that when this approach is followed, it is more difficult to form the fibers because of the resultant low melt viscosity of the polymer, and subsequently to process the PET fibers into a fabric using standard processing conditions because of the reduced tenacity. Such reduced tenacity leads to premature fiber breakage and consequential processing problems. These processing problems can only be partially overcome by gentler textile processing conditions, which are costly. Further, it has also been known that for PET, an intrinsic viscosity reduction as low as is tolerable from the standpoints of fiber formation and processing does not resolve the problem of pilling sufficiently to satisfy the market.

It is also well known to make modified chain branched polyester polymers in order to reduce pilling in the fabric. Chain branching of polyester fibers can be accomplished by inclusion of chain branching agents such as tetrafunctional chain branching agents, in particular, pentaerythritol and tetraethyl orthosilicate.

U.S. Pat. No. 3,576,773 discloses low pilling PET fibers containing trifunctional or tetrafunctional branching agents. Pentaerythritol is listed as a branching agent and is shown used in Example 5. It is known that pentaerythritol is a "permanent" branching agent, maintaining the bonds throughout processing of the fiber and the fabric.

U.S. Pat. No. 3,335,211 discloses low pilling modified PET fibers made from polymers in the presence of a polycondensation catalyst of antimony or titanium by adding an oxysilicon compound prior to melt spinning such as tetraethyl orthosilicate.

Tetraethyl orthosilicate (TES) forms a non-permanent chain branching susceptible to hydrolysis, especially under acidic conditions. When the TES bonds are broken by hydrolysis, the melt viscosity lowers, making the polymer difficult or impossible to process. However, if care is taken to protect TES modified polymers from moisture, much of the chain branching provided by the TES remains when these polymers are remelted in the course of being formed into fibers. Thus, a high molecular weight (high intrinsic viscosity) is maintained throughout the fiber formation process. This provides a high melt viscosity which facilitates fiber formation, and the high fiber strength needed for efficient processing of the fibers into fabric. Subsequently, under the hot wet acidic conditions used in dyeing the fabric, the TES chain branching sites are cleaved by hydrolysis. The resultant reduced molecular weight (reduced intrinsic viscosity) of the polymer in the fibers of the fabric reduces fiber strength, which is believed to lead to the reduced pilling observed.

In attempts to make low pilling flame resistant fibers, PET polymers modified with both a carboxyphosphinic acid and TES have been made. Such polymers could be readily made by conventional techniques, and they exhibited the chain branching expected based upon their TES content. However, upon remelting to form them into fibers, all chain branching was immediately lost, with a commensurate reduction of molecular weight as measured by intrinsic viscosity. As would be expected with such a loss of molecular weight, forming fibers from these polymers was too difficult to be practiced.

There remains a need to develop a processable polyester fiber having flame resistance and low pilling properties while also maintaining the other properties desired in the resulting fabric, especially the aesthetic properties of the fabric resulting from the polyester fiber.

SUMMARY OF THE INVENTION

It is therefore an object of the present invention to provide a polyester fiber and a method for producing the polyester fiber which has a combination of flame resistance and low pilling properties. The polyester fiber comprises the blended product of the following two polymers: a) a first polymer being the reaction product of dicarboxylic acid or a lower alkyl ester thereof, a diol, and an oxysilicon compound; and b) a second polymer being the reaction product of a dicarboxylic acid or a lower alkyl ester thereof, a diol, and a carboxyphosphinic acid monomer, said monomer being used in an amount from about 0.5 to about 20 mole percent based on a total amount of dicarboxylic acid or lower alkyl ester thereof and monomer, said monomer being of the general formula

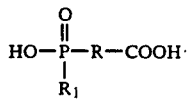

or a lower alkyl ester or cyclic anhydride of same monomer wherein R is a saturated, open chain or cyclic alkylene, arylene or aralkylene having one to 15 carbon atoms, and $R_1$ of the formula is alkyl having up to 6 carbon atoms, aryl or aralkyl.

The foregoing and other objects, advantages and features of the invention, and the manner in which the same are accomplished will become more readily apparent upon consideration of the following detailed description of the invention, taken in conjunction with the examples which illustrate exemplary embodiments.

DETAILED DESCRIPTION OF THE PREFERRED EMBODIMENT

The invention comprises forming a flame resistant, low pilling polyester fiber from the blended product of two polymers. One polymer is made from a dicarboxylic acid or a lower dialkyl ester of the acid, generally dimethyl terephthalate (DMT), a diol such as ethylene glycol, and an oxysilicon compound such a tetraethyl orthosilate. The second polymer is made from a dicarboxylic acid or a lower dialkyl ester of the acid, generally DMT, a diol such as ethylene glycol, and a flame resistance imparting carboxyphosphinic acid monomer being added in the amount of about 0.5 to about 20 mole percent based on the total amount of the diacarboxylic acid or lower alkyl ester and the carboxyphosphinic acid monomer.

Dicarboxylic acids suitable for the present invention include acids having the formula

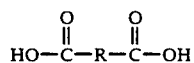

wherein R is selected from the group consisting of

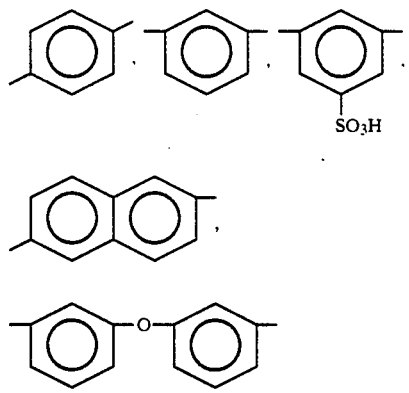

Suitable dicarboxylic acids include terephthalic acid, isophthalic acid, adipic acid and naphthalic acid.

It is well known in the art that suitable lower dialkyl esters of the TA may include in addition to DMT, diethyl terephthalate, dipropyl terephthalate, dibutyl terephthalate, dialkyl naphthalates such as 2,6-dimethyl naphthalate, or mixtures of two or more of these. The glycol may comprise in addition to ethylene glycol, 1,3-propylene glycol, 1,4-butylene glycol, and 1,4-dimethyl cyclohexyl glycol. Although the embodiment is directed to polyethylene terephthalate (PET), a specific type of polyester, this is not to be taken as a limitation, but as one embodiment of the present invention.

As is known to those familiar with the commercial production of polyester, the polyester polymer can be formed from a starting mixture of terephthatic acid and ethylene glycol or from dimethyl terephthalate and ethylene glycol. The polyester may be manufactured using a batch process or a continuous process. The reaction proceeds through the well known steps of esterification or transesterification (ester interchange), followed by condensation to form polyethylene terephthalate, commonly referred to as PET. A number of catalysts or other additives have been found to be useful in promoting either the esterification or condensation reactions, or in adding certain properties to the polyester. For example, manganese compounds are used as a catalyst for transesterification, antimony compounds are commonly used to catalyze the condensation reaction and inorganic compounds such as titanium dioxide ($TiO_2$) are commonly added as delustrants or for other purposes.

In the transesterification route, dimethyl terephthalate (DMT) and ethylene glycol (EG) are typically reacted in the presence of a catalyst (manganese) at atmospheric pressure and at a temperature of from about 180° C. to 230° C. In the presence of the catalyst, these components rapidly undergo ester interchange to yield an intermediate monomer and methanol. The reaction which is conveniently done with a ratio of about 1 mole of DMT, to 1.8 to 2.2 moles of EG, is reversible and is carried to completion by removing the methanol formed. During the ester interchange, the intermediate monomer is the substantial majority product (not considering the methanol), along with small amounts of low molecular weight oligomers.

The monomer is then polymerized by a polycondensation reaction, where the temperature is raised to about 280° C. to about 310° C. and the pressure is reduced to about 1 mm or less of mercury vacuum and in the presence of a suitable polymerization catalyst (antimony). From this reaction, poly(ethylene terephthalate) and ethylene glycol are formed. Because the reaction is reversible, the glycol is removed as it is evolved, thus forcing the reaction toward the formation of the polyester.

The polyester at temperatures of 280° to 310° C. is a viscous liquid which is forced through a spinneret to form individual filaments; a process generally referred to in the art as "spinning". If staple fiber is being made, the spun filaments are subsequently drawn, heat set, crimped, dried and cut with appropriate lubricating finishes added in a conventional manner. For continuous filament yarns, the spun filaments are variously either wound on a bobbin immediately or following other process steps including stretching. It will be understood by those familiar with textile manufacturing in general and synthetic fiber manufacture, in particular, that the word "spinning" has two connotations in the art, the first meaning being a term used to describe the manufacture of fiber from a polymer melt or solution, and the second being the twisting of staple fibers together—natural, synthetic or blended to form spun yarn. Both these meanings will be used herein in the conventional sense the polyester polymer of the present invention is produced.

Each polymer of the present invention is produced by previously described production methods for polyester, i.e., esterification or transesterification followed by polymerization via polycondensation. A batch process is generally employed, and catalyst and/or other typical additives are employed. In the preferred embodiment, both polymers are made by the DMT batch process route. For transesterification, manganese catalyst is used for both polymers. For polycondensation, antimony catalyst is added for the second polymer. No catalyst is used in making the first polymer. Both polymers are stabilized with a phosphorus compound and $TiO_2$ is added in making both polymers. It is noted and described hereinafter the process is tailored to the intrinsic viscosity of the polyester polymer. Intrinsic viscosities as used herein require lower spinning temperatures than those temperatures required for polyesters of higher intrinsic viscosity.

The present invention is directed to polyester fibers that also include flame resistant carboxyphosphinic acid monomer and the oxysilicon compound. The flame resistant carboxyphosphinic acid monomers and their use in polyester fibers are described in U.S. Pat. Nos. 3,941,752, 4,033,936; and RE 30,783 which are incorporated by reference.

The carboxyphosphinic acid monomers have the general structural formula:

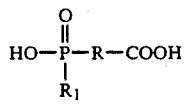

wherein R is a saturated, open-chained or cyclic alkylene, arylene or aralkylene, having from 1 to 15, preferably 2 to 10 carbon atoms, and $R_1$ is an alkyl radical having up to six carbon atoms, an aryl radical or an aralkyl radical. Preferred phosphorous-containing chain members are the structural units of the above formula with R being $C_2H_4$ and $R_1$ being $CH_3$ or $C_6H_5$.

When manufacturing the polyesters according to the process of the present invention, the carboxyphosphinic acids may be used as free acids, their esters or their cyclic anhydrides. Since above all the cyclic anhydrides (2,5-dioxo-1,2-oxapholanes) are easily obtainable, the use of these compounds is advantageous. However, as described in the U.S. Pat. No. 4,033,936 there are difficulties in using the cyclic anhydrides of the carboxyphosphinic acids. These difficulties were overcome, as disclosed in the '936 patent by previously dissolving the oxaphospholane at elevated temperatures in a diol suitable for the polyester manufacture, and subsequently adding this solution to the polyester manufacturing batch.

When the cyclic anhydrides are dissolved in a suitable diol, the ring is opened with the addition of 1 mole of diol. The dissolving temperature depends of course on the nature of the oxaphospholane and the diol; generally, it is in a range of from about 50° C. to 150° C. When 2-methyl-2,5-dioxo-1, 2-oxaphospholane is to be dissolved, the most advantageous temperature is about 105° to 130° C. The weight ratio of diol: oxaphospholane may widely vary. A lower limit is set only by the necessity of providing enough diol for the reaction, that is, at least 1 mole of diol per mole of anhydride, and of ensuring a sufficient viscosity of the solution. An upper limit of the diol amount is set by economic considerations only, since excess glycol has to be distilled off later on.

The carboxyphosphinic acid semi-esters formed by dissolution of the cyclic anhydrides in the diols, for example 2-carboxyethyl-methylphosphinic acid-ethylene glycol ester, are substances that are viscous liquids at room temperature which do not decompose, or do so to an insignificant extent only at the elevated temperatures usually required for polyester manufacture, so that undesirable discoloration does not occur. The semi-esters are incorporated into the polyester chain molecules in the same manner as the other phosphorus containing modification agents used. The oxaphospholane solution in the corresponding diol is added to the polyester manufacturing batch in the same manner as is described for the carboxyphosphinic acids and their derivatives, namely, in case of reaction in known manner of starting substances usual for the manufacture of high molecular weight, especially fiber and film-forming, linear polyesters, before or during the polycondensation. or just before it is complete. The amount of carboxyphosphinic acid component should be from 0.5 to 20 mole % of the total acid components.

Methods of preparing the carboxyphosphinic acid monomers and incorporation into polyester polymers are described in U.S. Pat. No. 3,941,752 and Re 30,783. The process of making the flame resistant polyesters from phosphorus containing compounds are further described in U.S. Pat. No. 4,033,936. In particular, in the described process, cyclic anhydride of the above phosphorus compounds is employed wherein the cyclic anhydride is dissolved at elevated temperatures in a diol solvent suitable for the polyester manufacture to form a carboxy-phosphinic acid semi-ester of said diol solvent in reacting said semi-ester with the dicarboxylic acid and the diol reactant to form the polyester.

Suitable oxysilicon compounds having the formula

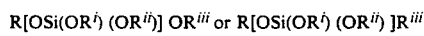

wherein R, $R^i$, $R^{ii}$ and $R^{iii}$ are an alkyl radical having from 1 to 10 carbon atoms or may be an aryl radical each R, $R^i$, $R^{ii}$, and $R^{iii}$ may differ within the formula. These esters are commonly identified as tetramethyl orthosilicate, tetraethyl orthosilicate (TES), tetra(2-hydroxyethyl) orthosilicate, carboethoxyethyl triethoxysilane, phenyltrimethoxysilane, ethyl triethoxysilane, diphenyl dimethoxysilane, etc. Mixed esters may also be employed. Amounts employed in the polymer range from 0.1 to 1.0 weight percent of the DMT.

In view of the foregoing, an example of the process for making flame resistant low pilling polyester of the present invention will be described in detail.

The batch process for each polymer used in the present invention starts with transesterification performed at atmospheric pressure and at 180° to 220° C. For the polymer modified with an oxysilicon compound, the reactor is loaded with dimethyl terephthalate, ethylene glycol, TES and a transesterification catalyst, and additives such as $TiO_2$ and optical brightener if they are being used. A thermostabilizer is added to the batch after the transesterification is completed. For the polymer modified with a carboxyphosphinic acid, the reactor is loaded at the beginning with only dimethyl terephthalate, ethylene glycol, a transesterification catalyst, and additives such as $TiO_2$ and optical brighteners if they are being used. The carboxyphosphinic acid in ethylene glycol solution, a thermostabilizer and condensation catalyst are added to the batch after the transesterification is completed. The polymerization stage is then run at 280°-300° C. at a strong vacuum of 0.3 to 3.0 mm Hg. When the desired degree of polymerization is reached, the polymers are extruded from the reactor, quenched in water and cut into chips.

Subsequently, the polymers are blended and dried and melted in an extruder at 270° C. to 275° C. and spun into fibers according to methods well known in the art involving quenching, finish application and takeup.

Prior to spinning into fibers, each polymer batch is tested for solution viscosity in dichloroacetic acid. Subsequent to the spinning operation the fibers are processed through a drawing process at heat setting temperatures to impart desired tensile properties in the filaments. In this regard, heat setting temperatures most preferred are generally greater than 120° C., and preferably from between about 125° and 140° C. These fibers are then cut into staple length. The cut staple fibers are processed into yarns which are subsequently converted into fabrics and then into various products including garments, draperies, bedspreads, etc.

The fabrics made according to the process generally have what is called low pilling characteristics. The term "low pilling" or its equivalent means herein that the tested material obtains a value of 3 to 4 as defined in ASTM D-3512-82 entitled "Standard Test Method for Pilling Resistance and Other Related Surface Changes of Textile Fabrics: Random Tumble Pilling Tester Method". The value of 5 indicates no pill formation, whereas the values of less than 5 indicate various levels of pilling.

The following examples illustrate specific embodiments of the invention, but the invention is not limited to such examples.

EXPERIMENTAL PROCEDURE

For Example 1, batches were prepared in which each polymer of Example 1 was produced at approximately 2.1 to 1 mole ratio of ethylene glycol (EG) to DMT in a batch process. In each case, the vessel was first charged with the standard polyester raw materials including DMT, EG and suitable catalysts in the amounts shown in the tables. Furthermore, TES was added with the raw materials for the TES containing polymer.

During charging of the raw materials and the subsequent heat-up, the vessel was subjected to an inert gas purge to aid in preventing oxidation. The batch was also agitated with a stirrer to assure homogenous commingling of the raw materials. At the start of the ester interchange reaction (approximately when the reactor contents reached 150° C.-160° C.), the flow of nitrogen gas was terminated. The autoclave temperature during ester interchange rose from approximately 150° C. to 160° C. to about 180° C. to 230° C. During the ester interchange the methanol was continuously removed to force the reaction toward the production of the monomer.

At this point of the reaction, the ester interchange reaction was substantially complete. A stabilizer, $TiO_2$ slurry and for the FR polymer a 50% phospholane solution of 2-methyl-2,5-dioxo-1,2-oxaphospholane (hereinafter referred to as phospholane) in ethylene glycol were added and the reaction mixture was stirred for about five minutes.

The polycondensation was carried out by raising the temperature to 28° C. and reducing the pressure to 0.5mm Hg. At the end of the polycondensation, samples were taken off and quenched to allow for the measurements of solution viscosity.

EXAMPLE 1

Various polyester fibers were made to demonstrate the effect of the present invention of making a polyester from the blending of the two polymers.

30 kg batches of each of three polymers were prepared in accordance with the formulations shown in Table 1 and the experimental procedure similar to that described herein.

In Experiment A, a polymer was prepared employing 70 ppm manganese catalyst for the ester interchange, 0.55% tetraethylortho silicate and titanium dioxide. At the end of ester interchange, 54 ppm of phosphorous was added.

In Experiments B and C, two polymer batches were prepared employing 70 ppm manganese in the form of an acetate based on DMT, 330 ppm antimony in the form of an oxide based on DMT, titanium dioxide and 3.10% phospholane. At the end of ester interchange, 54 ppm of phosphorus in the form of an acid and/or an ester based on DMT was added.

TABLE 1

|  | POLYMER ONE | POLYMER TWO | |
|---|---|---|---|
|  | A | B | C |
| Mn, ppm | 70 | 70 | 70 |
| Sb, ppm | 0 | 330 | 330 |
| TES, % | 0.55 | 0 | 0 |
| TiO$_2$, % | 0.29 | 0.29 | 0.29 |
| P, ppm | 54 | 30 | 30 |
| Phospholane, % | 0 | 3.10 | 3.10 |
| SV (OMC) | 683 | N/A | N/A |
| SV (DCA) | 427 | 696 | 688 |

One polymer blend has a 50:50 blend of polymer A and polymer B resulting in an acceptable polyester fiber. A second blend was made of a 50:50 blend of polymer A and polymer C also resulting in an acceptable polyester fiber. This blending approach shows that the present invention overcomes the hydrolytic instability of a polyester polymer containing both TES and phospholane before spinning the fiber. SV is the solution viscosity in dichloroacetic acid (DCA) or a mixture of ortho and meta cresols (OMC).

EXAMPLE 2

Polyester fabrics were made to demonstrate the effect of the present invention on both pilling and flame resistance. Two polymers A and B were prepared in accordance with Table II.

TBALE II

|  | A | B |
|---|---|---|
| DMT, qts | 200 | 200 |
| Glycol, qts | 140 | 140 |
| TES, % | 0.55 | — |
| Phospholane, % | — | 3.1 |
| Mn, ppm | 70 | 70 |
| Sb, ppm | — | 330 |
| P, ppm | 54 | 30 |
| TiO$_2$, % | 0.29 | 0.29 |
| SV (OMC) | 602 | — |
| SV (DCA) | 405 | 742 |

Polymer A was blended with Polymer B in a 50:50 ratio in chip form. The blended polymer chips were spun into a 6.0 dpf polyester fiber, which was taken up on winder packages. Fibers from the winder packages were end-plied to form a single tow band creel for stretching. Stretching was performed using a hot bath prestretch process to minimize fuses and dark dye defects. The fiber was then put into an upholstery fabric which was tested for pilling and flammability. Test results are shown in TABLE III.

TABLE III

|  | FABRIC |
|---|---|
| Weight, oz/sq. yd | 13.97 |
| Random Tumble Pilling 30 and 60 min | 3 and 4 |
| Flammability Test NFPA - Small Scale | |

TABLE III-continued

|  | FABRIC |
|---|---|
| Drip Burn: | |
| Avg (sec) | 0.0 |
| Ind (sec) | 0.0 |
| Char Length: | |
| Avg (in.) | 3.1 |
| Ind (in.) | 3.3 |
| After flame: | |
| Avg (sec) | 0.0 |
| Ind (sec) | 0.0 |

*Avg (Average)
Ind (Individual)

Fabric produced from the polymer blend of the present invention passed the flammability and tumble pilling tests.

The foregoing invention has been described with considerable detail with reference to its preferred embodiments. However, variations and modifications can be made within the spirit and scope of the invention as described in the foregoing specification and defined in the appended claims.

That which is claimed is:

1. A flame resistant, low pilling polyester comprising the blended product of the following two polymers:
   a) a first polymer the reaction product of a dicarboxylic acid or a lower alkyl ester thereof, a diol and an oxysilicon compound; and
   b) a second polymer being the reaction product of a dicarboxylic acid or a lower alkyl ester thereof, a diol and a carboxyphosphinic acid monomer, said monomer being used in an amount of from 0.55 to 20 mole percent based on the total amount of dicarboxylic acid or lower alkyl ester thereof and monomer, said monomer of the general formula

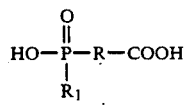

or a lower alkyl ester or cyclic anhydride of said monomer wherein R is a saturated, open-chain or cyclic alkylene, arylene or aralkyl having one to 15 carbon atoms, and R$_1$ is an alkyl having up to 6 carbon atoms, aryl or aralkyl.

2. A polyester of claim 1 wherein the blended product has from 1.5 to 20 mole percent of the carboxyphosphinic acid monomer contained therein.

3. A polyester of claim 1 wherein the blended product is a 50:50 blend of the first polymer and the second polymer.

4. A polyester according to claim 1 wherein R is C$_2$H$_4$ or benzyl and R$_1$ is CH$_3$, benzyl or butyl.

5. A polyester according to claim 1 wherein R is C$_2$H$_4$ and R$_1$ is methyl.

6. A polyester according to claim 1 wherein the units derived from dicarboxylic acid are essentially terephthalic acid units and the units derived from the diol are essentially units of a diol of the formula HO (CH$_2$)$_n$ OH wherein n is 2 to 4, or the diol units are derived from 1,4-cyclohexanedimethanol.

7. A polyester according to claim 1 wherein the units derived from dicarboxylic acid are essentially terephthalic acid units and the units derived from diol are essentially ethylene glycol units.

8. A polyester according to claim 6 wherein the oxysilicon compound has the formula $R[OSi(OR^i)(OR^{ii})]OR^{iii}$ or $R[OSi(OR^i)(OR^{ii})]R^{iii}$ or wherein $R$, $R^i$, $R^{ii}$, $R^{iii}$ is a radical such as methyl, ethyl, 2-hydroxyethyl, butyl, phenyl or mixed groups.

9. A polyester according to claim 8 wherein the lower alkyl ester of the dicarboxylic acid is dimethyl terephthalate, and the diol is ethylene glycol.

10. A garment made containing the flame resistant, low pilling polyester of claim 1.

11. A garment made containing the flame resistant, low pilling polyester of claim 10.

12. A flame resistant, low pilling polyester comprising the blended product of the following two polymers
   a) a first polymer being the reaction product of dimethyl terephthalate, ethylene glycol and tetraethyl ortho silicate; and
   b) a second polymer being the reaction product of dimethyl terephthalate, ethylene glycol and 2-carboxyethyl methyl phosphinic acid.

13. A polyester of claim 12 wherein the blended product has from 1.5 to 20 mole percent of the phosphonic acid contained therein.

14. A polyester of claim 12 wherein the blended product is a 50:50 blend of the first polymer and the second polymer.

15. A garment made containing the flame resistant, low pilling polyester of claim 12.

16. A method of making a flame resistant, low pilling polyester which comprises the blended product of the following two products:
   a) a first polymer being the reaction product of a dicarboxylic acid or a lower alkyl ester thereof, a diol and an oxysilicon compound; and
   b) a second polymer being the reaction product of a dicarboxylic acid or a lower alkyl ester thereof, a diol and a carboxyphosphinic acid monomer, said monomer being used in an amount of from 0.5 to 20 mole percent based on the total amount of dicarboxylic acid or lower alkyl ester thereof and monomer, said monomer of the general formula

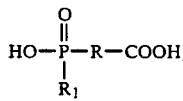

or a lower alkyl ester or cyclic anhydride of said monomer wherein R is a saturated, open-chain or cyclic alkylene, arylene or aralkylene having one to 15 carbon atoms and $R_1$, is an alkyl having up to 6 carbon atoms, aryl or aralkyl.

17. A method according to claim 16 wherein the blended product has from 1.5 to 20 mole percent of the carboxyphosphinic acid contained therein.

18. A method according to claim 16 wherein the blended product is a 50:50 blend of the first polymer and the second polymer.

19. A method according to claim 16 wherein said oxysilicon compound is tetraethyl orthosilicate.

20. A method according to claim 16 wherein said dicarboxylic acid is terephthalic acid, said ester is dimethyl terephthalate, and said diol is ethylene glycol.

21. The method as claimed in claim 16 wherein said dicarboxylic acid is terephthalic acid, said ester is dimethyl terephthalate, and said diol is ethylene glycol.

22. A pilling polyester comprising the blended product of the following two polymers:
   a) a first polymer being the reaction product of a dicarboxylic acid or a lower alkyl ester thereof, a diol and an oxysilicon compound; and
   b) a second polymer being the reaction product of a dicarboxylic acid or a lower alkyl ester thereof, a diol and a carboxyphosphinic acid monomer, said monomer being used in an amount of from 0.55 to 20 mole percent based on the total amount of dicarboxylic acid or lower alkyl ester thereof and monomer, said monomer of the general formula

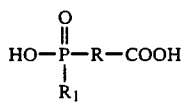

or a lower alkyl ester or cyclic anhydride of said monomer wherein R is a saturated, open-chain or cyclic alkylene, arylene or aralkyl having one to 15 carbon atoms, and $R_1$ is an alkyl having up to 6 carbon atoms, aryl or aralkyl.

23. A polyester of claim 22 wherein the blended product has from 1.5 to 20 mole percent of the carboxyphosphinic acid monomer contained therein.

24. A polyester of claim 22 wherein the blended product is a 50:50 blend of the first polymer and the second polymer.

25. A polyester according to claim 22 wherein R is $C_2H_4$ or benzyl and $R_1$ is $CH_3$, benzyl or butyl.

26. A polyester according to claim 22 wherein R is $C_2H_4$ and $R_1$ is methyl.

27. A polyester according to claim 22 wherein the units derived from dicarboxylic acid are essentially terephthalic acid units and the units derived from the diol are essentially units of a diol of the formula $$HO (CH_2)_n OH$$

wherein n is 2 to 10, or the diol units are derived from 1,4-cyclohexanedimethanol.

28. A polyester according to claim 22 wherein the units derived from dicarboxylic acid are essentially terephthalic acid units and the units derived from diol are essentially ethylene glycol units.

* * * * *